April 7, 1936.

L. O. PARKER

Re. 19,920

CONNECTER

Original Filed May 28, 1930

Inventor

LESLIE O. PARKER.

By Spencer, Hardman & Fehr his Attorneys

Reissued Apr. 7, 1936

Re. 19,920

UNITED STATES PATENT OFFICE 19,920

CONNECTER

Leslie O. Parker, Anderson, Ind., assignor, by mesne assignments, to General Motors Corporation, Detroit, Mich., a corporation of Delaware Original No. 1,952,141, dated March 27, 1934, Serial No. 456,415, May 28, 1930. Application for reissue June 4, 1934, Serial No. 728,980

3 Claims. (Cl. 173—269)

This invention relates to electrical connecter units for theft protective and other devices of automotive vehicles, and it is one of the objects of this invention to provide an electrical connecter that will operate to maintain an electrical connection with an armored terminal of a piece of electrical apparatus.

It is a further object of the invention to provide a yielding contact member of a terminal connecter whereby electrical connection will be completed and maintained throughout all stages of connecter engagement.

A further object of this invention is to improve contact elements in connecter units.

Further objects and advantages of the present invention will be apparent from the following description, reference being had to the accompanying drawing wherein a preferred embodiment of one form of the present invention is clearly shown.

Figure 1:
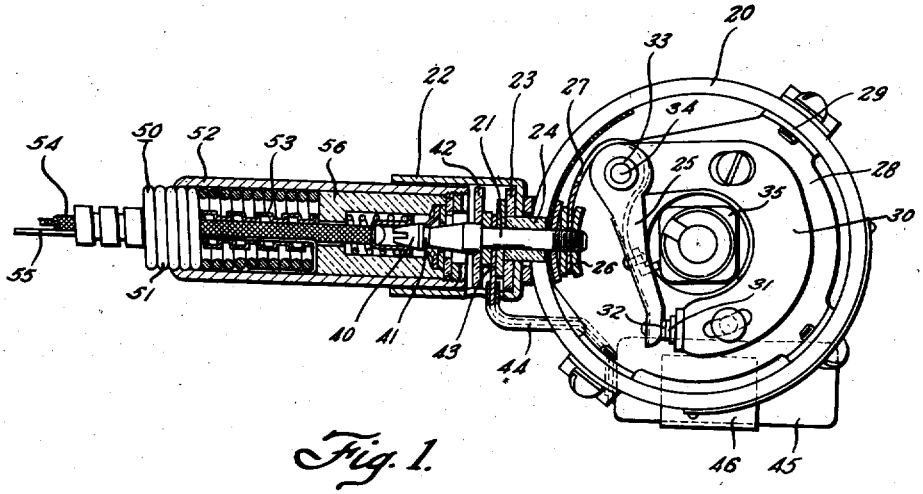
Fig. 1 is a view, partly in plan and partly in longitudinal section, illustrating the use of my improvement as applied to a self locking connection with a piece of electrical apparatus.
Figure 4:
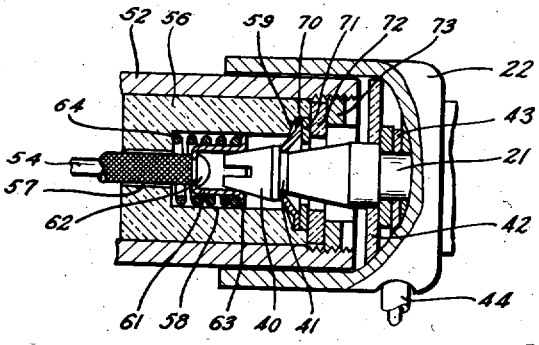
Fig. 4 is an enlarged sectional view similar to Fig. 2, but illustrating the parts in cooperative relation with respect to the electrical apparatus with which it is connected.

With particular reference to the drawing, 20 refers to a cup of a piece of electrical apparatus, as a timer to which a control unit 50 has a self locking connection and electrical engagement, as illustrated particularly in Figs. 1 and 4. The electrical apparatus 20 may be any preferred element of structure having a terminal stud 21 enclosed in an armored sleeve 22, and insulated from both the cup and sleeve by reason of the dielectric members 23 and 24. The terminal 21 is in electrical engagement with a circuit breaker lever 25 within the cup 20 through the agency of locking and connecting means 26 and 27 respectively.

The circuit breaker mechanism 25 is of the conventional form used in ignition equipment, and includes a breaker plate 28 secured to the cup 20 at 29. A contact bracket 30 is carried by the plate and has a contact 31 for engagement with contact 32 supported by circuit breaker lever 25. The circuit breaker lever 25 is in insulated relation with respect to the bracket 30 through the agency of a dielectric bushing 33 about a pivot 34, and is in electrical communication with the terminal stud 21, through the agency of the conductor 27 which operates also as a circuit breaker spring urging the same into following engagement with a timer cam 35 at the axis of the timer cup 20.

The terminal stud 21 being insulated with respect to the housing 20 thereby provides an exterior terminal of the circuit breaker mechanism, and is adapted to make electrical and mechanical engagement with an armored conductor or controller 50 hereinbefore referred to. For this purpose the stud 21 terminates in a conical contact head 40 with a reduced neck 41, and is insulated relative to the enclosing shell 22 with which it is surrounded, by an insulated washer 42 as illustrated in Figs. 1 and 4. Also connected with the stud 21 is a terminal 43 attached to a lead 44 of a condenser 45 mechanically and electrically connected with the housing 20 by a clip 46.

The connecter unit 50 hereinbefore referred to includes an armored cable 51 secured at one end within a protective shell 52 that has mating engagement with the protective shell 22 earlier described. Within the armored cable 51 a flexible metallic loom 53 enclosing an insulated conductor 54, and a stress wire 55 is secured so as to provide additional protection against unauthorized access to the enclosed conductor and manipulation of the parts thereby protected. Within the protective shell 52 and disposed against one end of the armor 51 is a dielectric sleeve 56 that is of stepped bore, forming the axially aligned passages 57, 58 and 59. The enlarged portion 58 will be designated as a contact chamber.

The conductor 54 terminates within the contact chamber 58 in a bared end 60 to which is secured a contact cup 61 as by soldering at 62. The cup 61 has its rim flared outwardly to provide a flange 63 of substantially the same diameter as the contact chamber 58, yet sufficiently smaller so as to allow the same to move freely axially of the central bore of the sleeve 56. This construction provides an annular recess, so to speak, about the end of the conductor and contact cup 61 within the chamber 58, and within this annular recess is disposed a contact urging spring 64 that is disposed against the bottom of the bore 58 and against the flange 63 of the cup.

Figure 2:
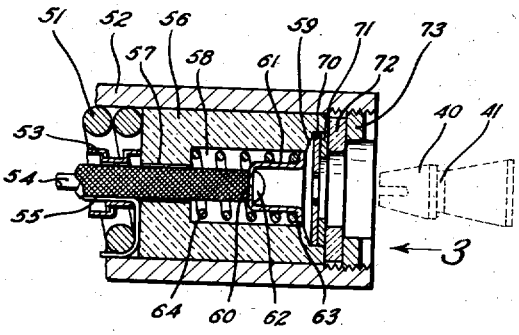
Fig. 2 is an enlarged longitudinal section illustrating the parts in position of rest or non-connecting engagement, the view being substantially that indicated by the line and arrows 2—2 of Fig. 3.
Figure 3:
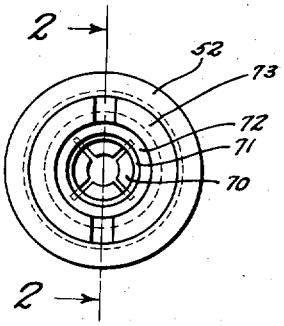
Fig. 3 is an end elevation of the connecter unit embodying my invention substantially as indicated by the arrow 3 of Fig. 2.

The spring normally tends to urge the cup and its attached conductor 54 along the axis of the sleeve 56 toward the enlarged opening 59 as illustrated in Fig. 2.

Within the largest of the bores of the sleeve 56, that is within the bore 59, there is disposed a spring locking device comprising the locking washer 70 and its backing washer 71 as clearly illustrated in the drawing. For retaining the locking device within the sleeve there is provided a dielectric washer 72 disposed against the end of the sleeve 56 within the end of the shell 52 and the washer 72 is retained therein by a spanner nut 73 threaded within the end of the shell 52.

Fig. 2 illustrates the position of the parts before the coupling unit is attached to the electrical apparatus, and here it will be seen that the contact cup 61 is urged to the right hand end of the chamber 58 by the spring 64, and that the locking device is in its original form. Here too, is illustrated in dotted lines the contact head 40 of the terminal stud 41, presented ready for mating engagement with the locking device and with the contact cup.

It is obvious that when the coupling unit is presented within the shell 22 and caused to mate therewith so that the contact head 40 is received by and locked with the spring lock washer 70, that the union of parts will be that illustrated in Fig. 4, wherein the contact head 40 has passed through the locking device so that the locking tongues thereof will have sprung into engagement with the neck 41, and so that the contact head will have engaged the cup 61 and forced it to the left hand end of the contact chamber 58 as illustrated. A secure mechanical and electrical connection is thereby made between the electrical device and the coupling unit, whereby the coupling unit is restrained from withdrawal from the electrical apparatus by reason of the locking device engaging the neck 41 of the insulated terminal stud, and whereby the contact cup 61, and hence the insulated conductor 54, are maintained in electrical engagement with the contact head 40 throughout all conditions of the locking engagement of the coupling unit with the electrical apparatus, by reason of the spring 64 being under compression and urging the cup 61 into firm engagement with the head 40.

While the form of embodiment of the present invention as herein disclosed, constitutes a preferred form, it is to be understood that other forms might be adopted, all coming within the scope of the claims which follow.

What is claimed is as follows:

1. A circuit connecter, comprising in combination; a terminal member having a socket and supporting a conductor wire, said socket having a movable cup-shaped contact connected to said conductor wire therein; a lock washer having integral inwardly pointing resilient tongues and mounted within said socket; a terminal stud having a groove with shoulders, and inserted through said washer and contacting with said cup to form electrical contact with said conductor wire, the resilient tongues of said washer engaging the shoulders of the groove of said terminal stud to prevent withdrawal of the stud from the socket.

2. A circuit connecter, comprising in combination; a terminal member having a socket and supporting one end of a conductor wire, said socket having a movable cup-shaped member connected to said conductor wire and a coil spring surrounding said conductor wire therein, said spring urging said cup-member in one direction; a lock washer having integral inwardly pointing fingers and secured within said socket to limit the movement of said cup member within said socket; a terminal stud having a groove with shoulders, and inserted through said washer and engaging said cup-member to form an electrical connection with said conductor wire, the coiled spring urging the cup against the stud and the resilient tongues of said washer engaging the shoulders of the groove of the stud to prevent withdrawal of said stud from the socket.

3. A self-locking electrical connecter comprising, in combination, a spring metal washer fixedly supported at its edge and having an opening so shaped as to provide resilient tongues projecting into a central aperture, a non-conducting sleeve for receiving a conductor, means for detachably and rigidly securing the peripheral portion of the washer against an end of the sleeve, a terminal member having a head portion adapted to be received by the washer and shaped so as to cause the tongues to be flexed sufficiently to permit the head portion to pass between them, said terminal member having a neck portion of reduced diameter for receiving the tongues after having cleared the head portion, a shoulder portion provided by the head for engaging the tongues to prevent separation of the terminal member from the washer, and a means within the sleeve comprising a spring pressed cup for electrically connecting the conductor with the terminal member.

LESLIE O. PARKER.